(12) United States Patent
Suematsu et al.

(10) Patent No.: US 8,780,203 B2
(45) Date of Patent: Jul. 15, 2014

(54) VIDEO RECORDING APPARATUS, VIDEO RECORDING SYSTEM AND VIDEO RECORDING METHOD EXECUTED BY VIDEO RECORDING APPARATUS

(75) Inventors: Hisayuki Suematsu, Hitachinaka (JP); Isao Shinada, Hitachinaka (JP); Syouta Tsutsui, Hitachinaka (JP); Hiroaki Arima, Hitachinaka (JP); Kimio Oura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/559,068

(22) Filed: Jul. 26, 2012

(65) Prior Publication Data

US 2013/0028570 A1   Jan. 31, 2013

(30) Foreign Application Priority Data

Jul. 27, 2011   (JP) .................. 2011-164638

(51) Int. Cl.
*H04N 5/92*   (2006.01)

(52) U.S. Cl.
USPC .......................................... 348/153; 386/224

(58) Field of Classification Search
USPC .......... 386/231, 223, 224, 341; 348/152–155
See application file for complete search history.

(56) References Cited

U.S. PATENT DOCUMENTS

| | | | | |
|---|---|---|---|---|
| 5,465,119 A * | 11/1995 | Demos | ........................ | 348/447 |
| 5,881,321 A * | 3/1999 | Kivolowitz | .................... | 396/53 |
| 6,065,072 A * | 5/2000 | Flath | ............................... | 710/29 |
| 6,647,060 B1 * | 11/2003 | Ueda | ........................ | 375/240.02 |
| 7,116,353 B2 * | 10/2006 | Hobson et al. | ............... | 348/150 |
| 7,453,519 B2 * | 11/2008 | Kubota et al. | ................ | 348/459 |
| 8,144,763 B2 * | 3/2012 | Falk | ......................... | 375/240.01 |
| 8,594,182 B1 * | 11/2013 | Pardue | ..................... | 375/240.01 |
| 2002/0015582 A1 * | 2/2002 | Matsumoto et al. | .......... | 386/111 |
| 2003/0141980 A1 * | 7/2003 | Moore et al. | .................. | 340/578 |
| 2005/0018049 A1 * | 1/2005 | Falk | ........................ | 348/207.99 |
| 2008/0212685 A1 * | 9/2008 | Masten | .................... | 375/240.24 |

FOREIGN PATENT DOCUMENTS

| | | | |
|---|---|---|---|
| JP | 2002-118822 A | | 4/2002 |
| JP | 2003023569 A | * | 1/2003 |
| JP | 2007036615 A | * | 2/2007 |
| JP | 2007300462 A | * | 11/2007 |
| JP | 2009182372 A | * | 8/2009 |

OTHER PUBLICATIONS

Okouchi, Machine generated translation of JP 2009-182372, Aug. 2009.*

(Continued)

*Primary Examiner* — David Harvey
(74) *Attorney, Agent, or Firm* — Crowell & Moring LLP

(57) ABSTRACT

The present invention enables an effective use of a ring buffer. A video recording apparatus includes a first thinning process unit which reduces a data size of camera videos transmitted from a camera to a frame rate number of the camera videos, and which stores the camera videos having undergone a thinning process in a ring buffer, and a second thinning process unit which further reduces the data size of the videos stored in the ring buffer at a frame rate number in accordance with a condition among a plurality of conditions. The first thinning process unit stores the camera videos in the ring buffer at a frame rate that is the lowest common multiple of the frame rate numbers of the plurality of conditions.

5 Claims, 6 Drawing Sheets

(56) References Cited

OTHER PUBLICATIONS

Araki et al, Machine generated transaltion of JP 2007-036615, Feb. 2007.*

Mechanical English translation of reference JP 2002-118822 A, which was previously filed and submitted as B1 on Jul. 26, 2012 (seven (7) pages).

* cited by examiner

VIDEO RECORDING APPARATUS, VIDEO RECORDING SYSTEM AND VIDEO RECORDING METHOD EXECUTED BY VIDEO RECORDING APPARATUS

CROSS REFERENCE TO RELATED APPLICATIONS

This application claims the foreign priority benefit under 35 U.S.C. §119 of Japanese Patent Application No. 2011-164638 filed on Jul. 27, 2011, the disclosure of which is incorporated herein by reference.

BACKGROUND OF THE INVENTION

1. Field of the Invention

The present invention relates to a video recording apparatus, a video recording system, and a video recording method which have a variable recording frame rate number in accordance with a condition.

2. Description of the Related Art

For an anticrime purpose and a purpose of resolving a crime case, it becomes general to place a monitoring system including a monitor camera at a bank, a convenience store, or a condominium building, etc., and such a monitoring system becomes popular recently. According to such a monitoring system, it is typical that, as a measure of precaution, videos are always recorded, and a sensor is installed at a predetermined location, and videos are recorded at a high frame rate before and after the generation of an alert with an alerting signal which is generated when the sensor detects an incident being as a trigger (see, for example, JP 2002-118822 A). A video recording apparatus disclosed in JP 2002-118822 A includes a ring buffer that temporarily stores videos (pre-frames) before and after the generation of an alert by several frames, and performs recording at a low frame rate as a normal recording mode through this ring buffer in a non-alerting condition (hereinafter, referred to as a normal condition). Moreover, when an alert is generated, the video recording apparatus changes the mode to the alerted recording mode, and keeps recording the videos (pre-frames) stored in the ring buffer and other videos (post-frames) after the alerting at a high frame rate until the trigger signal is subjected to a timeout processing.

According to the video recording apparatus disclosed in JP 2002-118822 A, however, the ring buffer stores the videos at the maximum frame rate number under any conditions, and thus the ring buffer is not utilized efficiently.

The present invention has been made in view of the above-explained circumstance, and it is an object of the present invention to efficiently utilize a ring buffer.

SUMMARY OF THE INVENTION

To achieve the above object, an aspect of the present invention provides a video recording apparatus that includes: a first thinning process unit which reduces a data size of camera videos transmitted from a camera to a frame rate number smaller than a frame rate number of the camera videos, and which stores the camera videos having undergone a thinning process in a ring buffer; and a second thinning process unit which has a frame rate number of a thinning process set in advance for each of a plurality of conditions, and which further reduces the data size of the videos stored in the ring buffer to the frame rate number in accordance with a condition among the plurality of conditions. The first thinning process unit stores the camera videos in the ring buffer at a frame rate number that is a lowest common multiple of the frame rate numbers of the plurality of conditions.

The other aspects of the present invention will be explained as needed in the following embodiments.

According to the present invention, it becomes possible to efficiently utilize a ring buffer.

DETAILED DESCRIPTION OF THE PREFERRED EMBODIMENTS

A mode to carry out the present invention (hereinafter, referred to as an "embodiment") will be explained with reference to the accompanying drawings as needed.

<First Embodiment>

A first embodiment of the present invention will be explained with reference to FIGS. 1 to 3.

<System Configuration>

Figure 1:
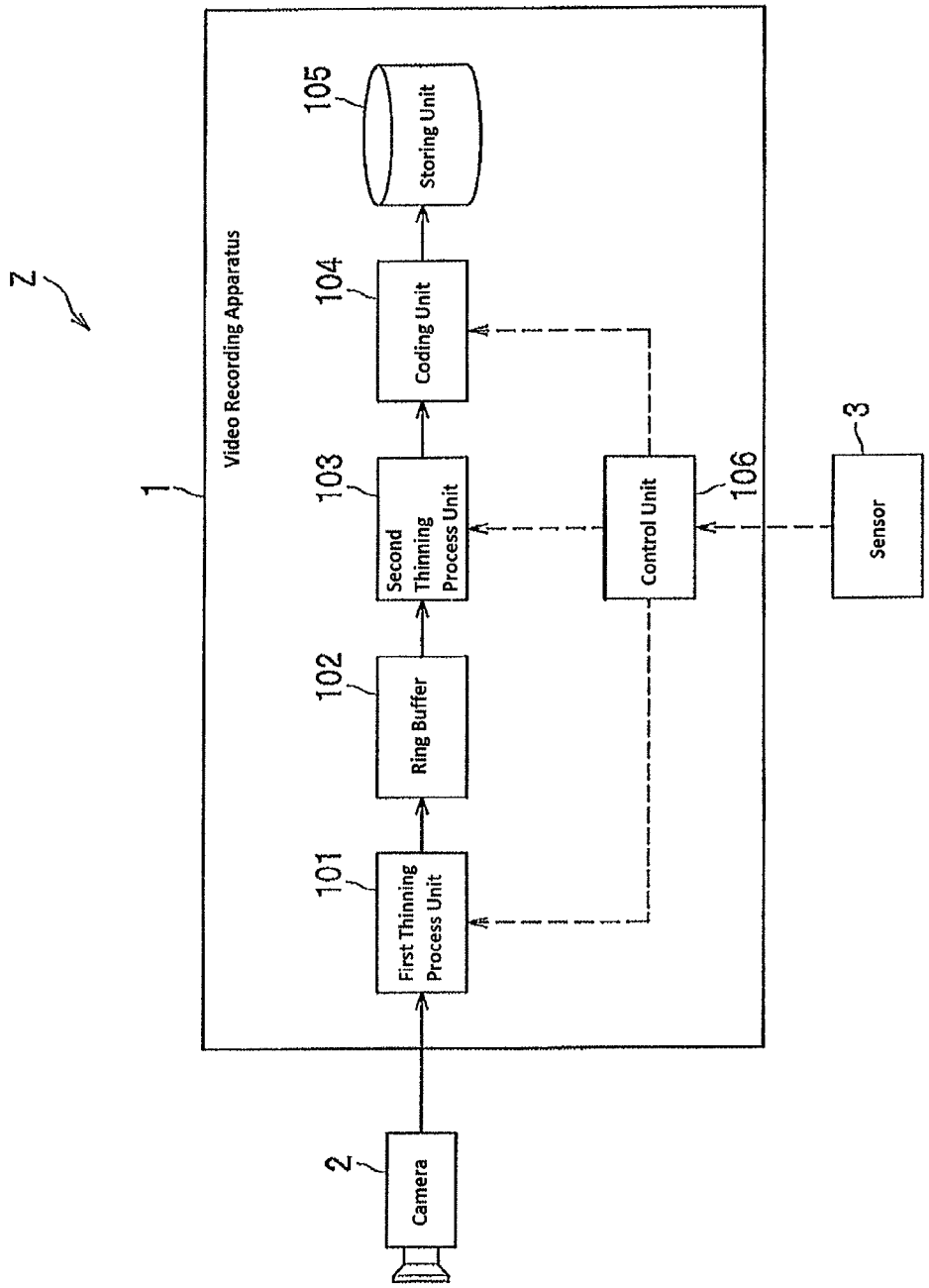
FIG. 1 is a functional block diagram showing an illustrative configuration of a video recording system according to a first embodiment of the present invention.

FIG. 1 is a functional block diagram showing an illustrative configuration of a video recording system according to the first embodiment.

A video recording system Z includes a camera 2 that picks up videos, a video recording apparatus 1 that records camera videos which are videos (motion images) picked up by the camera 2, and a sensor 3 provided for a momentum of alerting. The momentum of alerting is, for example, a case in which a locked door is opened without the use of a proper key.

The video recording apparatus 1 includes a first thinning process unit 101, a ring buffer 102, a second thinning process unit 103, a coding unit 104, a storing unit 105, and a control unit 106.

The first thinning process unit 101 performs a thinning process on videos in such a way that a frame rate number when the ring buffer 102 records camera videos becomes the lowest common multiple of the frame rate number at the time of recording in the normal condition and the frame rate number at the time of recording in an alerting condition, and stores the videos having undergone the thinning process in the ring buffer 102. The detail of the thinning process (a first thinning process) by the first thinning process unit 101 will be discussed later.

The ring buffer 102 can temporarily store a certain number of frame images in order to record pre-frames in the storing unit 105. This buffer is a memory having a first-in and first-out layout, and when temporarily storing images by what corresponds to a predetermined number of frames, reads out images in the order that the images are temporarily stored, and overwrites a new image in the order of the read images. That is, the ring buffer 102 stores images in a so-called FIFO scheme such that an older image is deleted when a new image is stored in the ring buffer 102. According to this embodiment, a frame of videos is referred to as an image.

Upon reception of a signal indicating that it is in a normal condition from the control unit 106, the second thinning process unit 103 reduces the frame rate number of images temporarily stored in the ring buffer 102 to the frame rate number (a lower resolution) set in advance and in the normal condition, and outputs the images having undergone the thinning process to the coding unit 104 (a thinning process in the normal condition). When it is desirable to further reduce the data size, the second thinning process unit 103 may perform line thinning as needed, and may output images at a further lower resolution to the coding unit 104. The line thinning is to reduce the size of a horizontal line image or vertical line image line by line.

Moreover, upon reception of a signal indicating an alerting condition from the control unit 106, the second thinning process unit 103 performs number reduction on the images temporarily stored in the ring buffer 103 so as to match the frame rate number (a higher resolution in comparison with the normal condition) set in advance in the alerting condition, and outputs the images having undergone the thinning process to the coding unit 104 without performing the line thinning (a thinning process in the alerting condition). In this operation, in order to reduce the data size when the storing unit 105 stores video data, the thinning process is also performed in the alerting condition.

Respective frame rate numbers in the normal condition and the alerting condition are set by a user to arbitrary values.

The coding unit 14 compresses the videos input from the second thinning process unit 103, and outputs the compressed videos to the storing unit 105.

The storing unit 105 stores the videos compressed by the coding unit 104, and it is typical that a large-capacity recording medium, such as a hard disk or an optical disk, is used for the storing unit 105 in order to record videos of a prolonged time.

The control unit 106 comprehensively controls the first thinning process unit 101, the second thinning process unit 103, and the coding unit 104, etc., and in particular, controls the second thinning process unit 103 whether to perform the thinning process in the normal condition or to perform the thinning process in the alerting condition based on signals from the sensor 3.

Respective units 101, 103, 104, and 106 are realized by a CPU (Central Processing Unit) that runs a program which is stored in an unillustrated ROM (Read Only Memory) or HD (Hard disk) and which is extracted in a RAM (Random Access Memory).

<Example Thinning Process>

Figure 2:
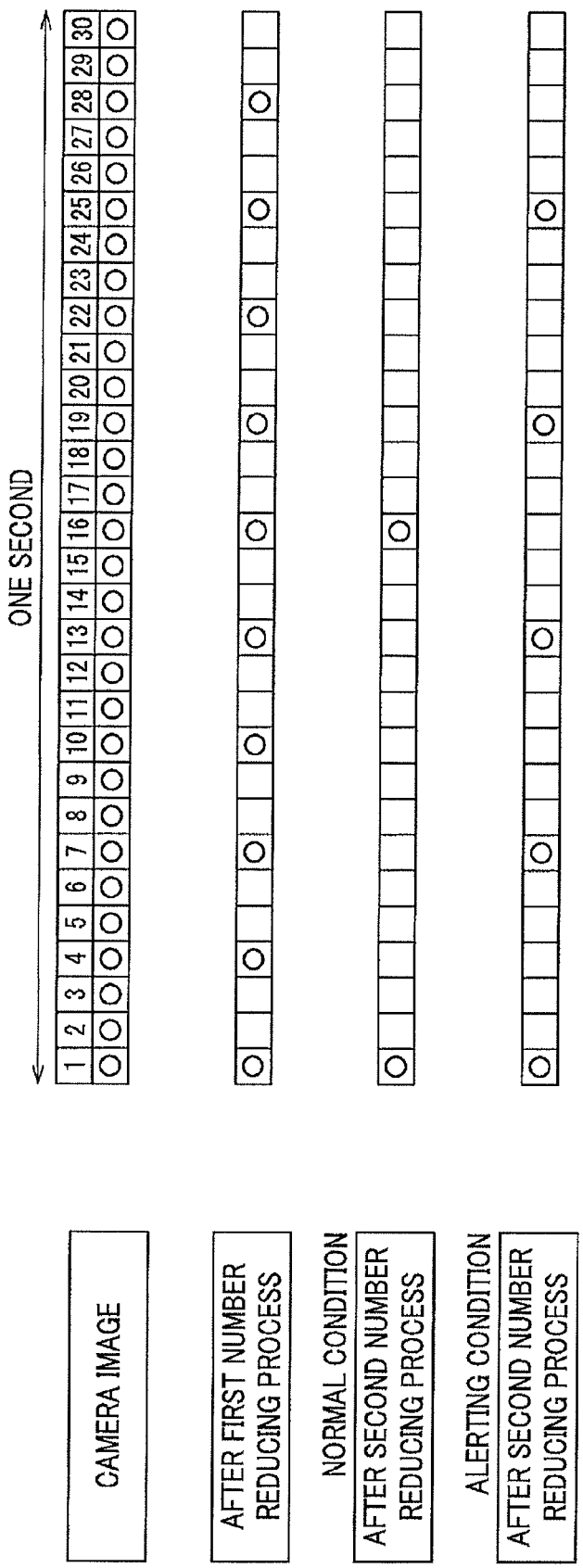
FIG. 2 is a diagram showing a specific example of a thinning process according to the first embodiment.

FIG. 2 shows a specific example of the thinning process according to the first embodiment.

In this example, it is presumed that the camera videos are 30 fps (frame per second), the frame rate number of the videos transmitted to the coding unit 104 in the normal condition is 2 fps, and the frame rate number of the videos transmitted to the coding unit 104 in the alerting condition is 5 fps. In the example explained in this embodiment, it is presumed that the ring buffer 102 has buffer areas by what corresponds to 100 frames.

The first thinning process unit 101 reduces the data size of the camera videos from the camera 2 to 10 fps that is the lowest common multiple of the frame rate number in the normal condition and the frame rate number in the alerting condition, and temporarily stores the videos having undergone the first thinning process in the ring buffer 102 (after the first thinning process).

As explained above, since the ring buffer 102 has buffer areas by what corresponds to 100 frames, the ring buffer 102 can temporarily store videos (pre-frames) of 10 seconds.

Next, while no alerting signal is input from the sensor 3 through the control unit 106 (normal condition), the second thinning process unit 103 reduces the data size of the videos temporarily stored in the ring buffer 102 to 2 fps, and outputs the videos having undergone the second thinning process to the coding unit 104 (normal condition and after the second thinning process). Moreover, the second thinning process unit 103 may perform line thinning as needed to obtain videos at a lower resolution, and output such videos to the coding unit 104.

Conversely, when an alerting signal is input from the sensor 3 through the control unit 106 (alerting condition), the second thinning process unit 103 reduces the data size of the videos temporarily stored in the ring buffer 102 to 5 fps which is a higher resolution than that of the normal condition, and outputs the videos having undergone the second thinning process to the coding unit 104 without performing any line thinning (alerting condition and after the second thinning process).

As explained above, in the alerting condition, the videos (pre-frames) of 10 seconds stored in the ring buffer 102 are recorded in the storing unit 105 at a high resolution (in this embodiment, 5 fps). Thereafter, the camera videos input into the video recording apparatus 1 are also recorded in the storing unit 105 at a high resolution (5 fps) until the inputting of the alerting signal is terminated.

Since the first thinning process unit 101 performs the thinning process at the lowest common multiple of the frame rate number in the normal condition and the frame rate number in the alerting condition, the frames can be made thin uniformly in both normal condition and alerting condition.

This enables the reduction of the number of frames to be stored in the ring buffer 102, and the recording duration of the videos to be stored in the ring buffer 102 can be extended, resulting in an efficient use of the ring buffer 102.

Moreover, since the first thinning process unit 101 stores the videos in the ring buffer 102 at the frame rate number that is the lowest common multiple of the frame rate number in the normal condition and the frame rate number in the alerting condition, the videos can be immediately output at the frame rate in the alerting condition no matter at which timing the alerting signal is input to the video recording apparatus 1. That is, no matter at which time point the alerting signal is generated during times (times indicated by circle marks, respectively) shown in FIG. 2 at which images having undergone the first thinning process are stored, the second thinning process unit 103 can immediately perform number reduction on the videos at the frame rate number in the alerting condition.

In other words, no matter at which timing the inputting of the alerting signal is terminated during the times (times indicated by circle marks, respectively) shown in FIG. 2 at which images having undergone the first thinning process are stored, the second thinning process unit 103 can immediately return the number of reduction of the videos to the normal frame rate number.

<Flowchart>

Next, an explanation will be given of a video recording method according to the first embodiment with reference to FIG. 3 and also FIG. 1 as needed.

Figure 3:
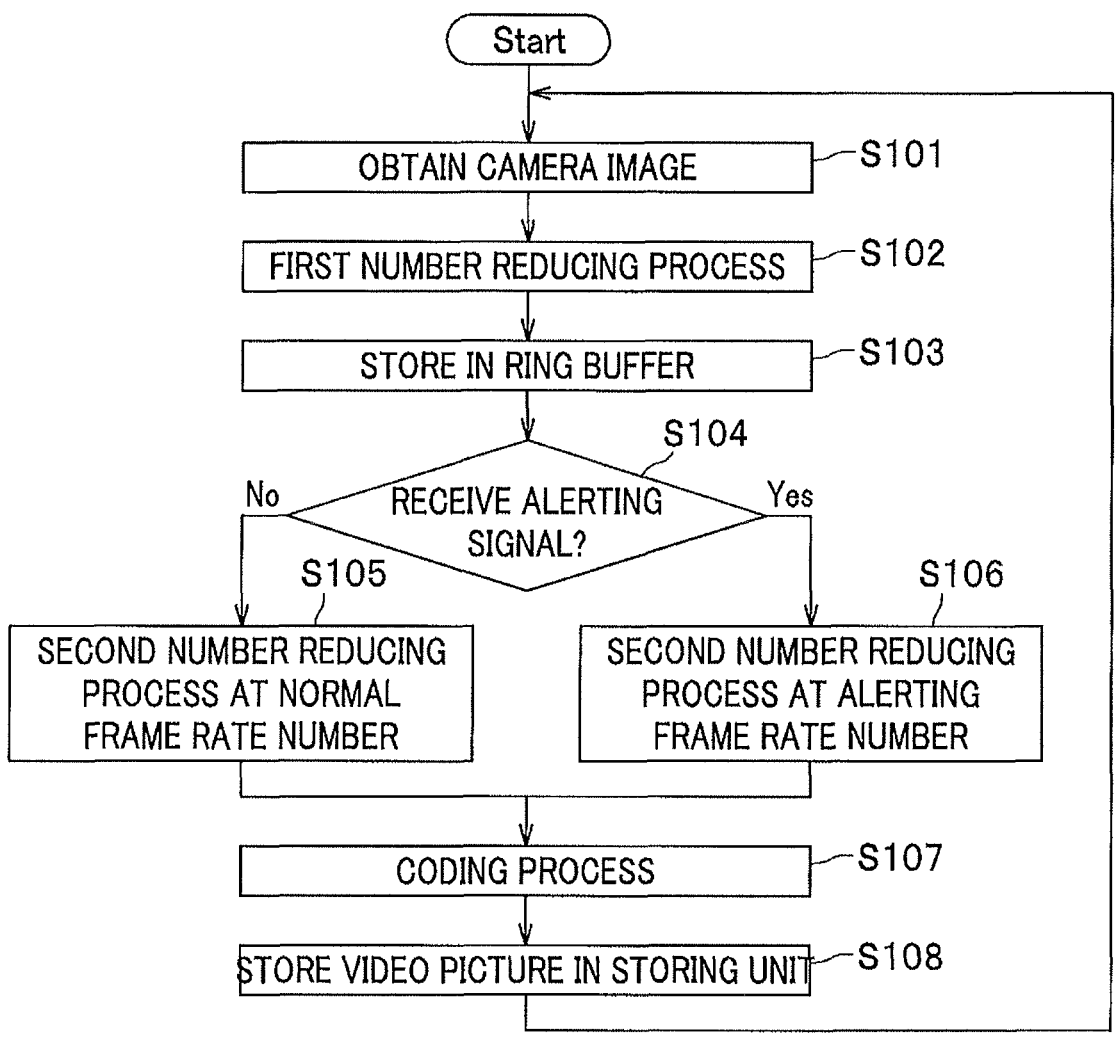
FIG. 3 is a flowchart showing a procedure of a process executed by a video recording apparatus of the first embodiment.

FIG. 3 is a flowchart showing process procedures by the video recording apparatus according to the first embodiment.

First, the first thinning process unit 101 obtains camera videos from the camera 2 (step S101).

The first thinning process unit 101 which has obtained the camera videos performs the first thinning process to reduce the data size of camera videos to the frame rate number which is the lowest common multiple of the normal frame rate number and the alerting frame rate number and which is smaller than the frame rate number of the camera videos (step S102).

Next, the first thinning process unit 101 stores the videos having undergone the first thinning process in the ring buffer 102 (step S103).

Subsequently, the control unit 106 determines whether or not the alerting signal is input from the sensor 3 (step S104).

Upon determination in the step S104, when receiving no alerting signal from the sensor 3 (step S104: NO), the control unit 106 notifies the second thinning process unit 103 of non-reception of the alerting signal, and the second thinning process unit 103 performs the second thinning process of extracting the videos from the ring buffer 102, and reducing the data size of the extracted videos to the normal frame rate number (step S105). Next, the second thinning process unit 103 outputs the videos having undergone the second thinning process to the coding unit 104. At this time, the second thinning process unit 103 may perform line thinning in accordance with a setting to obtain videos at a further lower resolution.

Upon determination in the step S104, when receiving the alerting signal from the sensor 3 (step S104: YES), the control unit 106 notifies the second thinning process unit 103 of the reception of the alerting signal, and the second thinning process unit 103 performs the second thinning process of extracting the videos from the ring buffer 102 and reducing the data size of the extracted videos to the alerting frame rate number (step S106). Next, the second thinning process unit 103 outputs the videos having undergone the second thinning process to the coding unit 104.

After the step S105 or S106, the coding unit 104 performs a coding process of compressing the videos having undergone the second thinning process (step S107), and stores the compressed videos in the storing unit 105 (step S108).

According to the first embodiment, the second thinning process unit 103 changes the frame rate number depending on the two conditions: the normal condition; and the alerting condition, but the present invention is not limited to this configuration. For example, the frame rate number of the videos to be output may be changed depending on equal to or greater than three conditions. In this case, the first thinning process unit 101 performs the first thinning process at the frame rate number that is the lowest common multiple of the frame rate numbers of respective conditions, and stores the videos having undergone the thinning process in the ring buffer 102.

<Brief Summary of First Embodiment>

According to the first embodiment, the videos to be stored in the ring buffer 102 can be downsized, and the recording duration of the videos stored in the ring buffer 102 can be extended. Hence, the ring buffer 102 can be used efficiently.

Moreover, the first thinning process unit 101 stores the videos in the ring buffer 102 at the frame rate number that is the lowest common multiple of the frame rate number in the normal condition and the frame rate number in the alerting condition. Accordingly, no matter at which timing the alerting signal is input to the video recording apparatus 1, the video output at the frame rate number in the alerting condition is enabled immediately. Furthermore, no matter at which time point the inputting of the alerting signal is terminated during the times (times indicated by circle marks) at which the videos having undergone the first thinning process are stored, the second thinning process unit 103 can immediately return the thinning process to the frame rate number in the normal condition.

<Second Embodiment>

Next, an explanation will be given of a second embodiment of the present invention with reference to FIGS. 4 to 6. In respective figures relating to the second embodiment, the same structural element as that of the first embodiment will be denoted by the same reference numeral and the duplicated explanation thereof will be omitted.

<System Configuration>

Figure 4:
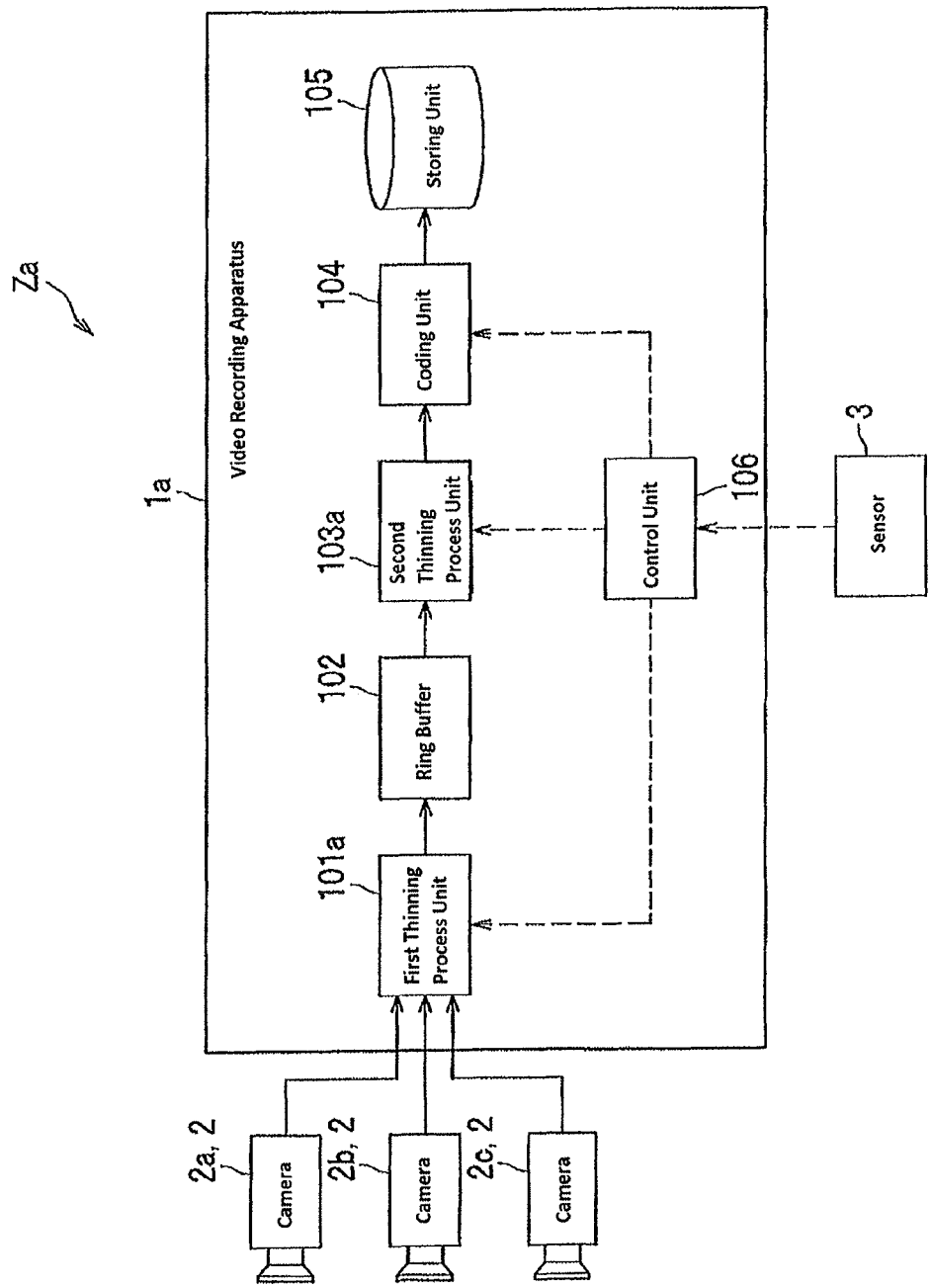
FIG. 4 is a functional block diagram showing an illustrative configuration of a video recording system according to a second embodiment of the present invention.

FIG. 4 is a functional block diagram showing an illustrative configuration of a video recording system according to the second embodiment.

In a video recording system Za shown in FIG. 4, the difference from the video recording system Z of FIG. 1 is that a plurality of cameras 2 (according to the example shown in FIG. 4, cameras A2a to C2c) are connected.

Moreover, a first thinning process unit 101a performs, for each camera, the first thinning process on the camera videos transmitted from each camera.

Furthermore, a second thinning process unit 103a performs, for each camera, the second thinning process on the videos having undergone the first thinning process and stored in the ring buffer 102.

Respective units 101a, 103a, 104, and 106 are realized by a CPU that runs a program which is stored in an unillustrated ROM or HD and which is extracted in a RAM like the first embodiment.

<Example Thinning Process>

Figure 5:
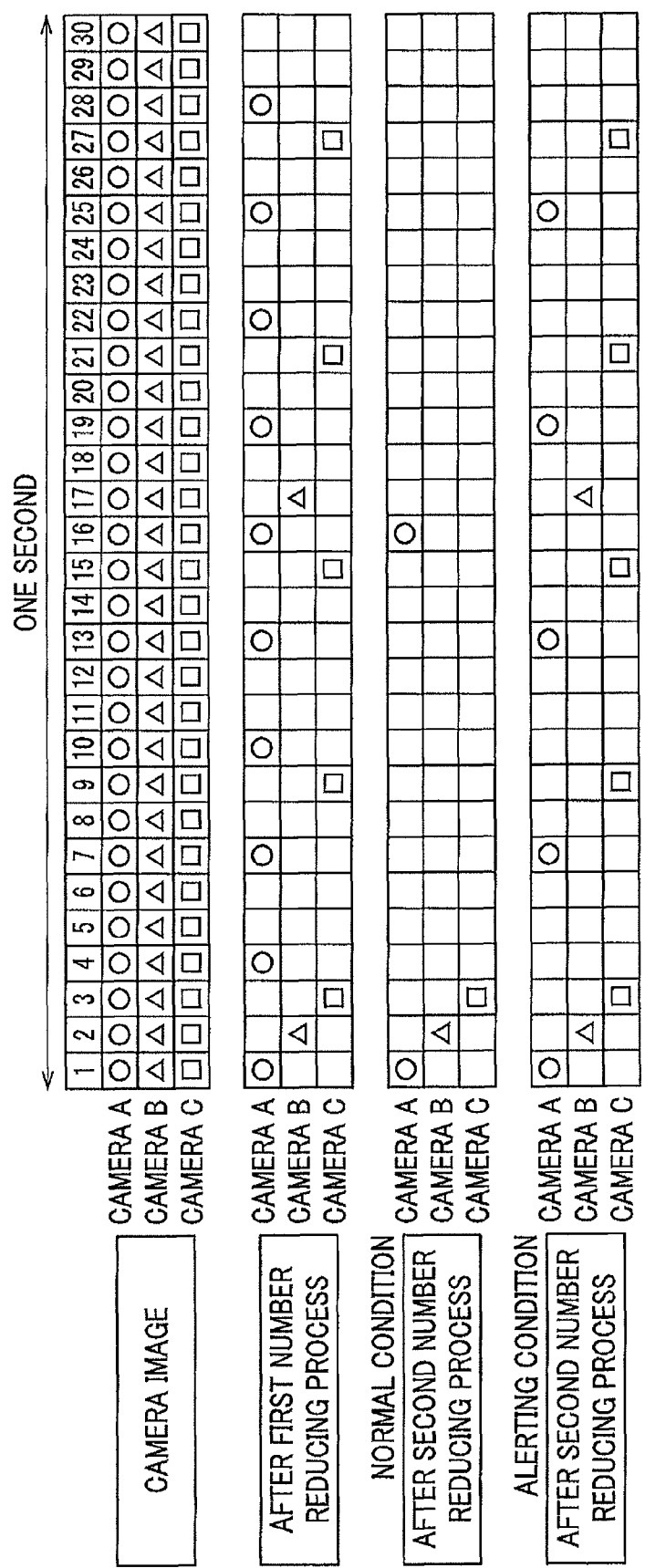
FIG. 5 is a diagram showing a specific example of a thinning process according to the second embodiment.

FIG. 5 shows a specific example of the thinning process according to the second embodiment.

For the setting of the frame rate numbers of videos output to the coding unit 104 from respective cameras 2 (cameras A2a to C2c), the following setting is applied. The camera videos transmitted from respective cameras 2 have a frame rate number of 30 fps in this embodiment.

Camera A2a: 2 fps in the normal condition and 5 fps in the alerting condition

Camera B2b: 1 fps in the normal condition and 2 fpst in the alerting condition

Camera C2c: 1 fps in the normal condition and 5 fps in the alerting condition

Through the above-explained setting, the frame rate number of the camera A2a after the first thinning process becomes 10 fps that is the lowest common multiple of the frame rate number of 2 fps in the normal condition and the frame rate number of 5 fps in the alerting condition.

Moreover, the frame rate number of the camera B2b 1 after *the first thinning process becomes* 2 fps that is the lowest common multiple of the frame rate number of 1 fps in the normal condition and the frame rate number of 2 fps in the alerting condition.

Likewise, the frame rate number of the camera C2c after the first thinning process becomes 5 fps that is the lowest common multiple of the frame rate number of 1 fps in the normal condition and the frame rate number of 5 fps in the alerting condition.

The ring buffer 102 has buffer areas by what corresponds to 100 frames.

As shown in FIG. 5, the first thinning process unit 101a of the video recording apparatus 1a performs the first thinning process at the frame rate of 10 fps, 2 fps, or 5 fps for each camera 2, and inputs the videos having undergone the first thinning process to the ring buffer 102 (after the first thinning process). At this time, it is desirable that a user should adjust the frame rate number in advance so that the images of respective cameras 2 do not overlap one another.

Since the ring buffer 102 has buffer areas by what corresponds to 100 frames, for the remaining buffer areas of 83 (100−(10+2+5)) frames, the recording duration of the videos to be stored in the ring buffer 102 may be extended, or a new camera 2 may be added and the remaining buffer areas may be used for the videos of such a newly added camera.

Note that the number of the ring buffer 102 is one.

When no alerting signal is input from the sensor 3 through the control unit 106 (normal condition), for the videos temporarily stored in the ring buffer 102, the second thinning process unit 103a reduces the frame rate number to 2 fps for the camera videos from the camera A2a, 1 fps for the camera videos from the camera B2b, and 1 fps for the camera videos from the camera C2c as shown in FIG. 5 (normal condition after the second thinning process). Moreover, the second thinning process unit 103a may perform line thinning as needed in order to obtain videos at a further lower resolution, and output the videos of such a lower resolution to the coding unit 104.

Conversely, when the alerting signal is input from the sensor 3 through the control unit 106 (alerting condition), for the videos temporarily stored in the ring buffer 102, the second thinning process unit 103a reduces the frame rate number to 5 fps for the camera videos from the camera A2a, and outputs the videos to the coding unit 104 without performing any line thinning to maintain a high resolution as shown in FIG. 5 (alerting condition after the second process). Regarding the camera videos from the camera B2b and the camera videos from the camera C2c, the frame rate number of such videos stored in the ring buffer 102 is already the frame rate number in the alerting condition. Accordingly, no thinning process is performed on the videos from the camera B2b and the camera C2c, and no line thinning is also performed, but such videos as those are at a high resolution are directly output to the coding unit 104.

<Flowchart>

Next, with reference to FIG. 6 and also FIG. 4 as needed, an explanation will be given of a video recording method according to the second embodiment.

Figure 6:
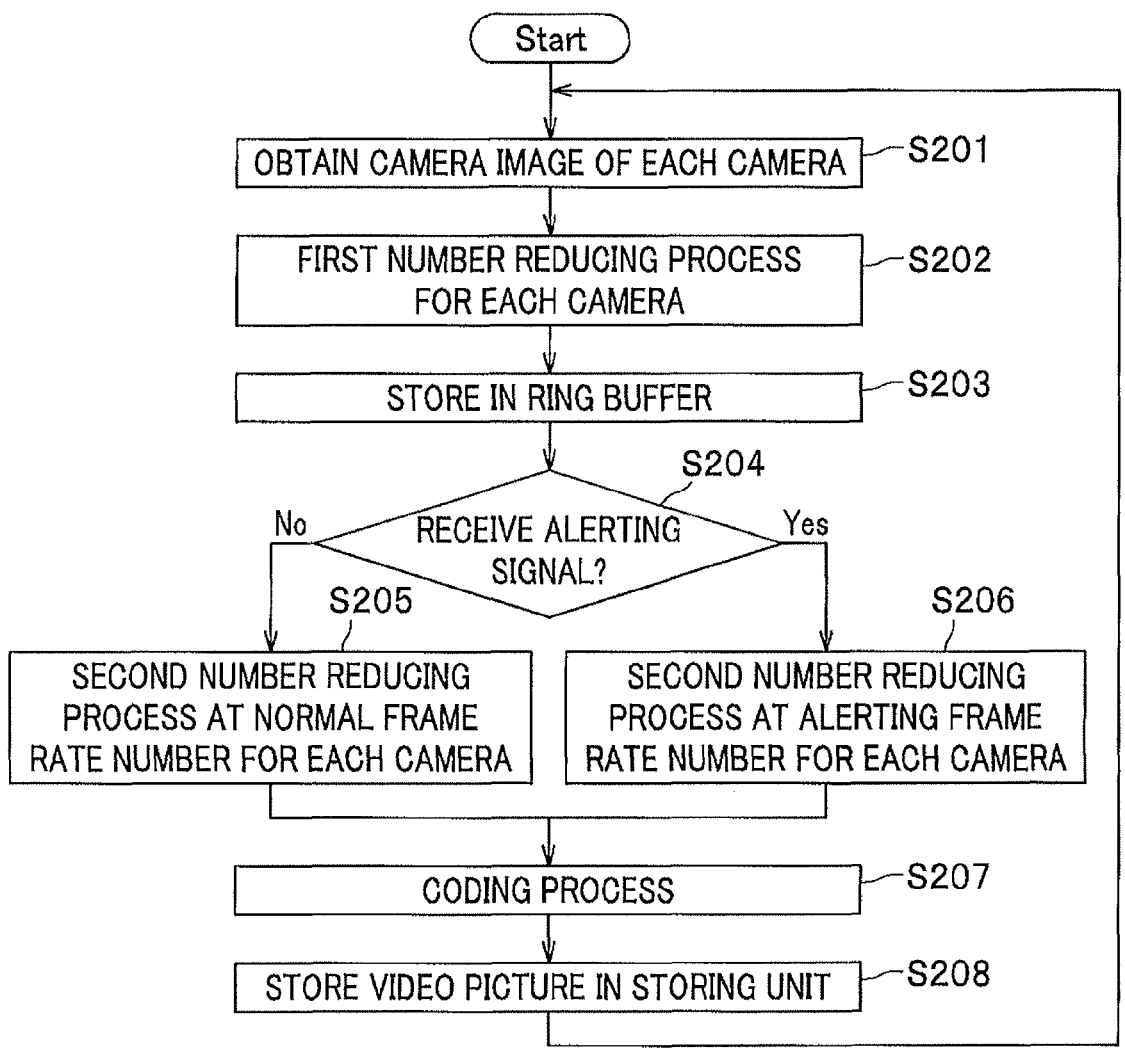
FIG. 6 is a flowchart showing a procedure of a process executed by a video recording apparatus of the second embodiment.

FIG. 6 is a flowchart showing a process procedure by the video recording apparatus of the second embodiment.

First, the first thinning process unit 101a obtains camera videos from respective cameras 2 (step S201).

The first thinning process unit 101a that has obtained camera videos from respective cameras 2 performs, for each camera 2, the first thinning process of reducing the data size of camera videos to the frame rate number which is the lowest multiple common of the frame rate number in the normal condition and the frame rate number in the alerting condition and which is smaller than that of the camera videos (step S202).

Next, the first thinning process unit 101a stores, for each camera 2, the videos having undergone the first thinning process to the ring buffer 102 (step S203).

Subsequently, the control unit 106 determines whether or not the control unit 106 receives the alerting signal from the sensor 3 (step S204).

Upon determination in the step S204, when receiving no alerting signal from the sensor 3, (step S204: NO), the control unit 106 notifies the second thinning process unit 103a of the non-reception of the alerting signal. Next, the second thinning process unit 103a performs the second thinning process of extracting the videos corresponding to each camera 2 from the ring buffer 102 at the frame rate number of each camera 2 in the normal condition (step S205). Subsequently, the second-thinning process unit 103a outputs the videos having undergone the second thinning process to the coding unit 104. At this time, the second thinning process unit 103a may further perform line thinning depending on the setting, and output videos at a further lower resolution to the coding unit 104.

Upon determination in the step S204, when receiving the alerting signal from the sensor 3 (step S104: YES), the control unit 106 notifies the second thinning process unit 103a of the reception of the alerting signal. Next, the second thinning process unit 103a performs the second thinning process of extracting the videos corresponding to each camera 2 from the ring buffer 102 at the frame rate number of each camera 2 in the alerting condition (step S206). Thereafter, the second thinning process unit 103a outputs the videos having undergone the second thinning process to the coding unit 104.

After the step S205 or S206, the coding unit 104 performs the coding process of compressing the videos having undergone the second thinning process (step S207), and stores the compressed videos in the storing unit 105 (step S208).

According to the second embodiment, the second thinning process unit 103a changes the frame rate number depending on the two conditions: the normal condition; and the alerting condition, but the present invention is not limited to this configuration, and the frame rate number may be changed depending on equal to or greater than three conditions. In this case, the first thinning process unit 101a may perform the thinning process at a frame rate that is the lowest common multiple of the frame rate numbers of respective conditions for each camera 2, and store videos of each camera 2 having undergone such a thinning process in the ring buffer 102.

Moreover, when, for example, each of the plurality of cameras 2 is provided with the sensor 3, the second thinning process unit 103a may respond to the alerting signal camera by camera. For example, when an alerting signal is generated with respect to the camera A2a, but no alerting signal is generated with respect to the cameras B2b and C2c, the second thinning process unit 103a may perform the second thinning process on the videos from the camera A2a only at the frame rate number in the alerting condition, and may perform the second thinning process on the videos from the cameras B2b and C2c at respective frame rates in the normal condition.

<Brief Summary of Second Embodiment>

According to the video recording apparatus disclosed in. JP 2002-118822 A, when a plurality of cameras are installed, camera videos input from respective cameras are switched through a switcher. Moreover, according to the video recording apparatus disclosed in JP 2002-118822 A, the camera videos are stored in the ring buffer with the buffer areas thereof being evenly divided for respective cameras. When, for example, the three cameras use the ring buffer for 30 frames, the video recording apparatus disclosed in JP 2002-118822 A divides the buffer areas of the ring buffer into areas each for 10 frames, and the camera videos from each camera are stored in each 10 frames. That is, when N number of cameras are installed, if the frame number of the ring buffer is F, the camera videos of each camera to be stored in the ring buffer is fixed to F/N frames.

In contrast, according to the second embodiment, as explained with reference to FIG. 5, the frame rate number of the camera videos from each camera to be stored in the ring buffer can be set to a different frame rate number as needed.

What is claimed is:

1. A video recording apparatus comprising:
a first thinning processor which reduces a data size of camera videos transmitted from a camera to a frame rate number smaller than a frame rate number of the camera videos, and which stores the camera videos having undergone a thinning process in a ring buffer; and
a second thinning processor which has a frame rate number of a thinning process set in advance for each of a plurality of conditions, and which further reduces the data size of the videos stored in the ring buffer to the frame rate number in accordance with a condition among the plurality of conditions,
the first thinning processor being configured to store the camera videos in the ring buffer at a frame rate number that is a lowest common multiple of a first frame number and a second frame number, wherein the first frame number is a frame number when the camera video is recorded in a normal condition and the second frame number is a frame number when the camera video is recorded in a case where an alarm signal is input to the video recording apparatus,
wherein the second thinning processor reduces a data size of the data-size-reduced camera videos to the first frame number when the alarm signal is not input to the video recording apparatus, and
wherein the second thinning processor reduces the data size of the data-size-reduced camera videos to the second frame number when the alarm signal is input to the video recording apparatus.

2. The video recording apparatus according to claim 1, wherein
the video recording apparatus comprises a plurality of the cameras,
frame rate numbers in accordance with the plurality of conditions are set for each camera, and
the first thinning processor stores, for each camera, the camera videos in the ring buffer at a frame rate that is a lowest common multiple of the frame rate numbers of the plurality of conditions for each camera.

3. A video recording system comprising:
a camera; and
the video recording apparatus according to claim 1.

4. A video recording method executed by a video recording apparatus, comprising steps of:
reducing, by a first thinninurocessor, a data size of camera videos transmitted from a camera to a frame rate number smaller than a frame rate number of the camera videos and storing the camera videos having undergone a thinning process in a ring buffer,
setting, in advance, a frame rate number of a thinning process for each of a plurality of conditions, and reducing, by a second thinning processor, the data size of the videos stored in the ring buffer to the frame rate number in accordance with a condition among the plurality of conditions,
causing the first thinning processor to store the camera videos in the ring buffer at a frame rate that is a lowest common multiple of a first frame number and a second frame number, wherein the first frame number is a frame number when the camera video is recorded in a normal condition and the second frame number is a frame number when the camera video is recorded in a case where an alarm signal is input to the video recording apparatus,
wherein the second thinning processor reduces a data size of the data-size-reduced camera videos to the first frame number when the alarm signal is not input to the video recording apparatus, and
wherein the second thinning processor reduces the data size of the data-size-reduced camera videos to the second frame number when the alarm signal is input to the video recording apparatus.

5. The video recording method according to claim 4, wherein
frame rate numbers in accordance with the plurality of conditions are set for each of a plurality of cameras, and
the first thinning processor stores, for each camera, the camera videos in the ring buffer at a frame rate number that is a lowest common multiple of the frame rate numbers in accordance with the plurality of conditions for each camera.

* * * * *